(12) United States Patent
Miura

(10) Patent No.: US 7,160,487 B2
(45) Date of Patent: Jan. 9, 2007

(54) CONDUCTIVE COMPOSITION AND CERAMIC ELECTRONIC COMPONENT

(75) Inventor: Shuichi Miura, Yuri-gun (JP)

(73) Assignee: TDK Corporation, Tokyo (JP)

(*) Notice: Subject to any disclaimer, the term of this patent is extended or adjusted under 35 U.S.C. 154(b) by 297 days.

(21) Appl. No.: 10/717,504

(22) Filed: Nov. 21, 2003

(65) Prior Publication Data

US 2004/0099847 A1    May 27, 2004

(30) Foreign Application Priority Data

Nov. 25, 2002  (JP) .............................. 2002-341388

(51) Int. Cl.
| | |
|---|---|
| H01B 1/00 | (2006.01) |
| H01B 1/02 | (2006.01) |
| H01B 1/08 | (2006.01) |
| H01B 1/22 | (2006.01) |
| B32B 9/00 | (2006.01) |

(52) U.S. Cl. .................. 252/500; 252/513; 252/514; 428/688; 428/689

(58) Field of Classification Search ................ 252/512, 252/513, 514, 520.2; 428/688, 689
See application file for complete search history.

(56) References Cited

U.S. PATENT DOCUMENTS 4,493,789 A * 1/1985 Ueyama et al. ............. 252/514
4,696,764 A * 9/1987 Yamazaki ................... 252/503

FOREIGN PATENT DOCUMENTS

| JP | A 04-043504 | 2/1992 |
|---|---|---|
| JP | A 6-290985 | 10/1994 |
| JP | A 7-201223 | 8/1995 |
| JP | A 2000-340450 | 12/2000 |
| JP | A 04-043504 | 8/2005 |

* cited by examiner

Primary Examiner—Mark Kopec
Assistant Examiner—Jaison Thomas
(74) Attorney, Agent, or Firm—Oliff & Berridge, PLC

(57) ABSTRACT

Disclosed is a conductive composition used for a conductor of an electronic component, comprising a metal particle and a metal oxide particle which has an average particle size of 5 to 60 nm, a melting point of 1500° C. or higher, and a content of 0.1 to 10.0 wt % based on the amount of the metal particle. According to the conductive composition, even when the metal particle is made fine, a sintering initiation temperature can be adequately increased, thus a generation of a crack and a de-lamination can be prevented easily and firmly.

2 Claims, 3 Drawing Sheets

CONDUCTIVE COMPOSITION AND CERAMIC ELECTRONIC COMPONENT

BACKGROUND OF THE INVENTION

1. Field of the Invention

The present invention relates to a conductive composition used for a conductive material of an electronic component, and to a ceramic electronic component.

2. Related Background Art

It has proceeded to make a thin-layered dielectric and a thin-layered electrode corresponding thereto in order to comply with requirements of miniaturization and capacity enlargement of a capacitor.

There is a tendency that a metal powder comprised in an electrode paste used to form an electrode is made fine when making the thin-layered electrode. However, when the metal powder is made fine, a surface energy per unit volume increases and thereby, a sintering initiation temperature of the electrode is lowered. Thus, the difference in the sintering initiation temperatures between the electrode and the dielectric is increased. As a result, a crack or a de-lamination easily occurs, and reliability of the capacitor is lowered.

In order to suppress occurrence of the crack or the de-lamination, it is proposed to increase an amount of a compatible material added to the electrode paste (for example, refer to Japanese Patent Application Laid Open No. HEI 7-201223). The compatible material means such ceramics that have the same composition as that of the dielectric or do not deteriorate properties of the dielectric. In addition, the sintering initiation temperature of the compatible material is higher than that of the metal powder used for the electrode. The sintering initiation temperature of the electrode can approach that of the dielectric by increasing the amount of compatible material.

However, when the amount of compatible material is increased, a metal component per unit volume of the electrode is reduced. Thereby, continuity of the conductive material of the electrode is hindered, and the electrode effective area in the capacitor decreases. This means that the capacitance becomes small even in the same capacitor design.

On the other hand, a ceramic multilayer insulator also requires miniaturization and reduction of loss. In order to miniaturize the insulator, it is necessary to narrow the line width of the electrode and thin the thickness thereof. However, in the case of the above-mentioned configuration, the loss of the electrode line increases, and it becomes difficult to attain the low loss performance. Similarly, in the case of the insulator, when there is a big difference in the sintering initiation temperatures between the electrode and the ceramics, the crack or the de-lamination occurs and the reliability is lowered.

Hence, a study has been done in order to solve the aforementioned problem. For example, Japanese Patent Application Laid Open No. HEI 6-290985 discloses a conductive composition in which an oxide of at least one element selected among magnesium, zirconium, tantalum and rare earth element is added to a conductive paste made of the metal powder of nickel powder. In the above-mentioned publication, it is described that a generation of the crack can be prevented because an expansion of the nickel electrode is suppressed in a baking step by use of the above-mentioned composition.

Moreover, Japanese Patent Application Laid Open No. 2000-340450 discloses the conductive composition in which nickel powder coated with a magnesium oxide layer is compounded. The above-mentioned publication describes that by use of such method, a generation of the crack and the de-lamination can be suppressed by increasing the sintering initiation temperature of the electrode, and a moisture resistance load property can be improved to make a thin layer of the internal electrode.

SUMMARY OF THE INVENTION

However, the above-mentioned conventional conductive compositions have a room for improvement in the following points.

Namely, the conductive composition described in Japanese Patent Application Laid Open No. HEI 6-290985 has not paid an attention to a particle size of the added oxide. According to the study by the present inventors, when the particle size of the oxide used for the conductive composition is equal to or bigger than that of the metal powder, the sintering initiation temperature cannot be adequately increased, thus the crack and the de-lamination will occur. In addition, it is likely to deteriorate the continuity and the surface smoothness of the metal after baking.

Further, in the case of the conductive composition described in Japanese Patent Application Laid Open No. 2000-340450, as mentioned in this publication, several steps such as evaporation, a coating of magnesium compound, and a baking thereafter are required. Thereby, it causes problems that production steps are increased and a material manufacturing cost is enlarged in order to coat the nickel powder surface with the magnesium layer.

The present invention is attained in consideration of the problems imposed on the above-mentioned conventional art. The purpose is to provide a conductive composition for a ceramic electronic component which can adequately increase the sintering initiation temperature even when a fine metal is comprised in the conductive composition, and also can obtain the continuity and the surface smoothness of the sintered metal after baking. In addition, the ceramic electronic component can be obtained by a cheaper price without any special production steps and facilities. Moreover, another object of the present invention is to provide the ceramic electronic component which can effectively realize miniaturization and thinning by use of the conductive composition.

The present inventors have made every effort to attain the above-mentioned objects and found out that the above-described problems are solved by adding a metal oxide particle to the conductive composition, the metal oxide satisfying particular conditions in the average particle size and/or BET value. As a result, the inventors have achieved to accomplish the present invention.

Namely, a first conductive composition of the present invention is a conductive composition used for a conductive material of an electronic component, comprising a metal particle and a metal oxide particle which has an average particle size of 5 to 60 nm and a melting point of 1500° C. or higher, wherein a content of the metal oxide particle is 0.1 to 10.0 wt % based on the amount of the metal particle.

According to the first conductive composition, the metal oxide particle can exist in a state where the metal oxide particles are dispersed finely and uniformly by comprising the metal oxide particle satisfying the above-described particular conditions of the average particle size and the melting point with a specific content to that of the metal particle. Therefore, even when the metal particle is made fine, the sintering initiation temperature can be adequately increased, and the generation of the crack and the de-lamination can be prevented easily and firmly. Additionally, since the metal oxide particle exists in a state where the metal oxide particle is dispersed finely and uniformly in the metal particle, the continuity and the surface smoothness of the sintered metal after baking can be accomplished at a higher level. Further, a performance of the electronic component can be improved without increasing the amount of the metal oxide particle that is a compatible material.

The first conductive composition preferably further contains a binder resin and a solvent which can dissolve the binder resin. Thus, the conductive composition as a conductive paste can be effectively realized.

In the above-mentioned first conductive composition, the average particle size of the metal oxide particle is preferably ⅓ to ¹⁄₈₀ of that of the metal particle. By using such a metal oxide particle, the generation of the crack and the de-lamination can be more firmly prevented.

Furthermore, a second conductive composition of the present invention is a conductive composition used for a conductive material of an electronic component, comprising a metal particle and a metal oxide particle which has a BET value (BET specific surface area) of 20 to 200 m²/g and a melting point of 1500° C. or higher, wherein the content of the metal oxide particle is 0.1 to 10.0 wt % based on the amount of the metal particle.

According to the second conductive composition, by comprising the metal oxide particle satisfying the above-described particular conditions of the BET value and the melting point in comparison with a specific content to that of the metal particle, the sintering initiation temperature can be adequately increased even when the metal particle is made fine. Thus, the generation of the crack and the de-lamination can be prevented easily and firmly.

The above-mentioned second conductive composition preferably further contains the binder resin and the solvent which can dissolve the binder resin. Thus, the conductive composition as the conductive paste can be effectively realized.

In the second conductive composition, the BET value of the metal oxide particle is preferably 5 to 200 times that of the metal particle. By using such a metal oxide particle, the generation of the crack and the de-lamination can be firmly prevented.

Furthermore, a ceramic electronic component of the present invention comprises a ceramic substrate and a conductive layer which is formed in at least one of inside and outside of the ceramic substrate and comprises the metal particle and the metal oxide particle which has an average particle size of 5 to 60 nm and a melting point of 1500° C. or higher. The content of the metal oxide particle is 0.1 to 10.0 wt % based on the amount of the metal particle.

In the ceramic electronic component of the present invention, by forming a conductive layer which comprises the metal oxide particle satisfying the above-mentioned particular condition of the average particle size and the melting point in comparison with a specific content to that of the metal particle, a difference in the sintering initiation temperature between the conductive layer and the ceramic substrate becomes sufficiently small. Therefore, the generation of the crack and the de-lamination can be prevented easily and firmly.

Note that the above-described conductive layer of the ceramic electronic component is obtained by using the first conductive composition. However, a similar effect can be obtained when the electrode is formed by use of the second conductive composition.

The ceramic electronic component of the present invention is preferably provided with a capacitor which is formed by comprising the ceramic substrate and the conductive layer. Further, in the electrode of the capacitor, the metal particle is selected from at least one kind among nickel and nickel alloys, and the metal oxide particle is an oxide compound which comprises at least one kind of metals selected from magnesium, aluminum, titanium and zirconium.

In addition, the ceramic electronic component of the present invention is preferably provided with an insulator which is formed by comprising the ceramic substrate and the conductive layer. Further, in the electrode of the insulator, the metal particle is selected from at least one kind among silver and silver alloys, and the metal oxide particle is an oxide compound which comprises at least one kind of metals selected from magnesium, aluminum, titanium and zirconium.

DESCRIPTION OF THE PREFERRED EMBODIMENTS

Figure 1:
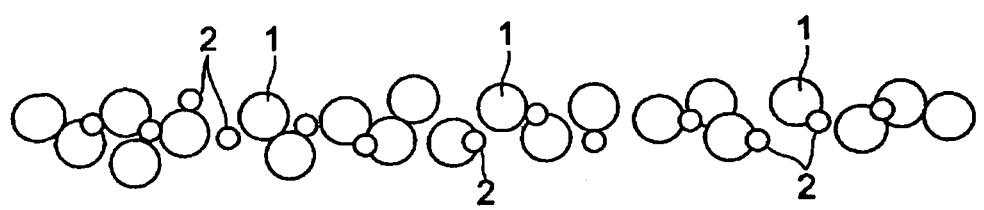
FIG. 1 is a schematic view showing an example of a state of a metal particle and a metal oxide particle comprised in a conductive composition of the present invention.

Hereafter, preferable embodiments of the present invention are described.

(Conductive Composition)

As described above, a conductive composition of the present invention comprises a metal particle and a metal oxide particle. The kind of the metal particle is suitably selected depending on a usage of the conductive composition. For example, when a capacitor electrode is formed by using the conductive composition of the present invention, preferably used examples for the metal particle are nickel (Ni) or Ni alloys such as Ni—Mn, Ni—Cr, Ni—Co and Ni—Al, and preferably used ones for the metal oxide particle are oxide compounds of a metal such as magnesium (Mg), aluminum (Al), titanium (Ti) and zirconium (Zr). Moreover, when an insulator electrode (winding) is formed by using the conductive composition of the present invention, preferably used examples for the metal particle are silver (Ag), copper (Cu), palladium (Pd) or alloys thereof, and preferably used ones for the metal oxide particle are oxide compounds of a metal such as Mg, Al, Ti and Zr. The metal oxide particle may be a mixture of two or more kinds of the metal oxides, and may be a complex oxide comprising two or more kinds of metals.

The average particle size of the metal oxide particle comprised in the conductive composition of the present invention is 5 to 60 nm, and more preferably 5 to 50 nm. When the average particle size of the metal oxide particle is less than 5 nm, the sintering initiation temperature becomes excessively high, and when exceeding 60 nm, the sintering initiation temperature cannot be adequately increased. Thus, in either case, the generation of the crack and the de-lamination cannot be adequately prevented.

In addition, the average particle size of the metal oxide particle is preferably 1/80 to 1/3 of that of the metal particle, and more preferably 1/80 to 1/10. When the average particle size of the metal oxide is less than 1/80 of that of the metal particle, the sintering initiation temperature becomes excessively high, and when exceeding 1/3, it gives a tendency that the sintering initiation temperature cannot be adequately increased.

Further, in the conductive composition of the present invention, the metal oxide particle may be used which has BET value of 20 to 200 $m^2/g$, and preferably 30 to 200 $m^2/g$. BET value of 20 to 200 $m^2/g$ is substantially equivalent to the average particle size of 5 to 60 nm. The metal oxide particle is accepted as long as at least one of BET value and the average particle size satisfies the above-mentioned condition.

Furthermore, BET value of the metal oxide particle is preferably 5 to 200 times that of the metal particle. When BET value of the metal oxide exceeds 200 times that of the metal particle, the sintering initiation temperature tends to excessively increase, and when being less than 5 times, the sintering initiation temperature tends to be unable to adequately increase.

The melting point of the metal oxide particle used in the present invention is 1500° C. or higher, and more preferably 1600° C. or higher. When the melting point of the metal oxide particle is less than 1500° C., the metal oxide particle is melted at temperatures that are a general sintering temperature (normally 900 to 1350° C.) to produce the ceramic electronic component or a sintering temperature of the metal particle (such as Ni, Ag and alloys thereof). The melting points of the preferred metal oxides are shown below.

MgO: 2800° C.
$Al_2O_3$: 2050° C.
$TiO_2$: 1750° C.
$ZrO_2$: 2677° C.

In the conductive composition of the present invention, the content of the metal oxide fine particle is 0.1 to 10.0 wt % based on the amount of the metal particle. When the content of the metal oxide particle is less than 0.1 wt % based on the amount of the metal particle, the sintering initiation temperature cannot be adequately increased, and when exceeding. 10.0 wt %, the sintering cannot proceed adequately. Thus, in either case, the generation of the crack and the de-lamination cannot be sufficiently prevented. In addition, when the conductive composition of the present invention is applied to the capacitor or the insulator, from the viewpoint of stably securing capacitance or Q value at a higher level, the content of the metal oxide particle is preferably 2 to 7.5 wt %, and more preferably 2 to 7 wt %, based on the amount of the metal particle.

The preferred type of the conductive composition of the present invention is a conductive paste. The conductive paste can be suitably realized by further compounding a binder resin and a solvent dissolving the binder resin in addition to the aforementioned metal particle and the metal oxide particle. The examples of the binder resin are cellulose resin such as ethyl cellulose, rosin group resin, polyvinyl group resin, butyral group resin, polyester group resin, acryl group resin, epoxy group resin, polyamide group resin, polyurethane group resin, alkyd group resin, maleic acid group resin, petroleum group resin, and the like. Among these, the preferable ones are acryl group resin and cellulose group resin such as ethyl cellulose. Additionally, the solvent is not particularly limited as long as it can dissolve the above-mentioned binder resin, however, the examples are alcohols such as ethanol, aromatic hydrocarbons such as toluene and xylene, ethers, ketones, chlorohydrocarbons, and the like. The binder resin and the solvent may be each used alone or used as a mixture of two or more kinds thereof.

Moreover, when the conductive composition of the present invention is used as the conductive paste, it may further comprise a surfactant, a plasticizer, an antistatic agent, an antifoaming agent, an antioxidant, a slip additive, a curing agent, and the like as additives if required.

According to the conductive composition of the present invention having the above-mentioned constitution, even when the metal particle is made fine, the sintering initiation temperature can be adequately increased, and the generation of the crack and the de-lamination can be prevented easily and firmly.

Figure 2:
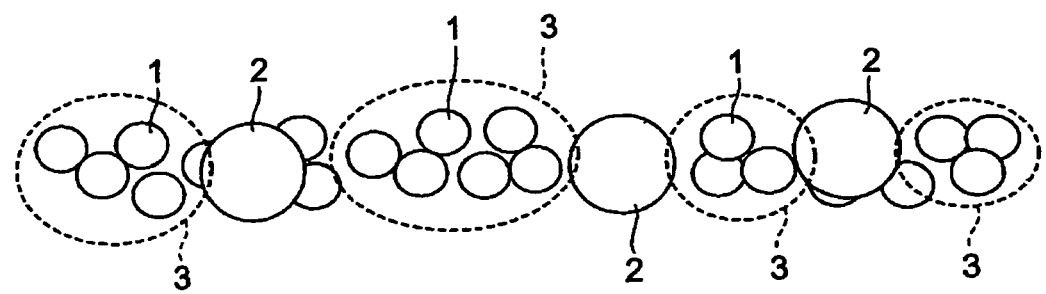
FIG. 2 is a schematic view showing an example of a state of a metal particle and a metal oxide particle comprised in a conductive composition of the prior art.

Herein, a reason why the above-mentioned effect can be obtained by use of the conductive composition of the present invention is explained by referring to the FIG. 1 and FIG. 2. FIG. 1 is a drawing schematically showing the state of the metal particle and the metal oxide particle comprised in the conductive composition of the present invention. Further, FIG. 2 is a drawing schematically showing the state of the metal particle and the metal oxide particle comprised in the conductive composition of the prior art. In each of FIG. 1 and FIG. 2, the reference numeral 1 represents the metal particle, and the reference numeral 2 represents the metal oxide fine particle.

In the present invention, by comprising the metal oxide fine particle 2 which satisfies the above-described particular conditions of the average particle size and/or BET value, and the melting point in the conductive composition, as shown in FIG. 1, the metal oxide particle 2 can be dispersed finely and uniformly in the metal particle 1. Hereby, the metal particle 1 can exist against the other adjacent metal particle 1 through the metal oxide fine particle 2, and the contact among the metal particles 1 themselves can be decreased. As a result, the sintering initiation temperature can be increased, and the generation of the crack and the de-lamination can be prevented.

On the contrary, as shown in FIG. 2, when the average particle size or the BET value of the metal oxide particle 2 is equal to or more than that of the metal particle 1, a ratio of the portion where the only metal particle 1 exists to that of the total composition becomes larger, thus the sintering initiation temperature cannot be adequately increased.

As described above, the conductive composition of the present invention is very useful for the conductive material of the ceramic electronic component, thus is suitably used for the capacitor described below, the insulator, the LC resonator, or the ceramic electronic component which is made by combining those parts with other elements.

Next, the ceramic electronic component of the present invention is described in detail.

Figure 3:
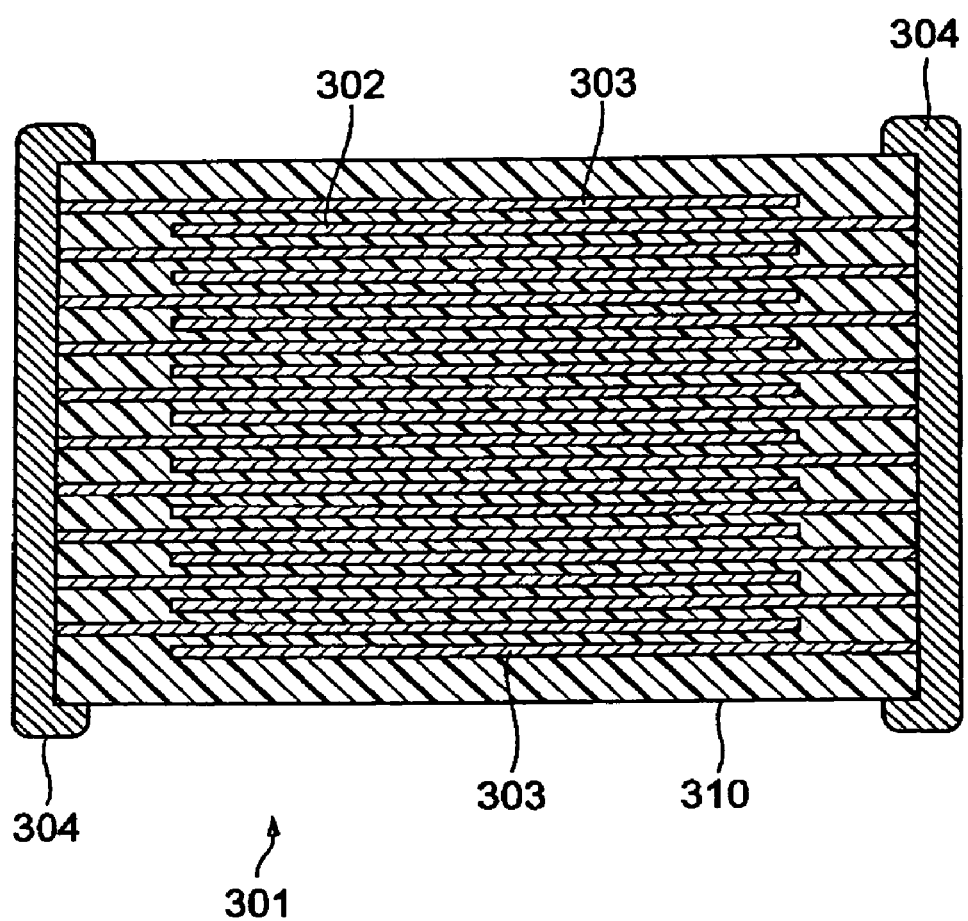
FIG. 3 is a schematic sectional view showing a preferable embodiment of a multilayer capacitor according to the ceramic electronic component of the present invention.

FIG. 3 is a schematic sectional view showing a preferable embodiment of a multilayer capacitor according to the ceramic electronic component of the present invention. The multilayer capacitor 301 shown in FIG. 3 is provided with a capacitor element body 310 and a pair of outside electrodes 304, 304. The capacitor element body 310 is made by alternately laminating a dielectric layer 302 and a conductive layer 303 for an inside electrode. The pair of outside electrodes 304, 304 is arranged on the two surfaces opposing to each other in the capacitor element body 310, and are each arranged in the end portion sides of the conductive layer 303. The conductive layers 303 are respectively conducted to one of the outside electrodes 304, 304 every two layers. Namely, in one conductive layer 303, the end portion thereof exposes to one surface of the above-mentioned two surfaces, and the end portion of the conductive layer 303 adjacent to the above-described conductive layer 303 exposes to another surface of the above-mentioned two surfaces, and each inside electrode 303 is electrically connected to one of the outside electrodes 304, 304. The shape of the capacitor element body 310 is not particularly limited, however, is usually a rectangular solid. Besides, a dimension of the capacitor element body 310 is not particularly limited, so the appropriate dimension may be determined in accordance with the usage. Generally, it is about (0.4 to 5.6 mm)×(0.2 to 5.0 mm)×(0.2 to 1.9 mm).

The dielectric layer 302 is formed by use of dielectric materials such as $BaTiO_3$, $TiO_2$, $CaZrO_3$, $MnO$ and $Y_2O_3$. These dielectric materials may be used alone or used in combination of two or more kinds.

The conductive layer 303 is formed by use of the conductive composition of the present invention. In this case, the conductive composition preferably comprises the metal particle of Ni or Ni alloy and the metal oxide which includes at least one kind of the metal oxide particle selected from Mg, Al, Ti and Zr.

The outside electrode 304 is formed by use of the conductive material. Such conductive materials are, for example, Ag, Ni, Cu, In, Ga or alloys thereof. As for the outside electrode 304, can be applied any one of printed film, plated film, evaporated film, ion-plated film, sputtered film, and multilayer film thereof.

Hereafter, an example of producing the multilayer capacitor 301 is explained. At first, by using the above-described dielectric materials, a dielectric sheet is made by use of pulling method, doctor blade method, reverse roll coater method, gravure coater method, screen printing method, gravure printing method, and the like. Meanwhile, the conductive paste is prepared by mixing the metal particle, the metal oxide particle, the binder resin and the solvent followed by kneading them. Then, the prepared conductive paste is coated on the surface of the dielectric sheet into the pattern of the conductive layer 303 by use of screen printing method, gravure printing method, offset printing method, and the like. Thereafter, a plural of dielectric sheets on which the conductive paste is coated are multilayer followed by a pressure bonding. Then, the multilayer forming product is baked at a predetermined temperature (preferably 900 to 1350° C.) in the air or atmosphere containing oxygen. Thus, the capacitor element body 310 can be obtained, which forms the inside electrode inside of the ceramic substrate. Subsequently, the paste for the outside electrode comprising the conductive material is coated on the predetermined surface of the capacitor element body 310, and baked to obtain the multilayer capacitor which forms the outside electrodes 304, 304 electrically connected to the conductive layer 303.

According to the above-mentioned embodiment, by use of the conductive composition of the present invention, the generation of the crack and the de-lamination can be prevented even when the dielectric layer 302 is thin-layered. More specifically, the multilayer capacitor having high reliability can be realized even when the thickness of the dielectric layer 302 is 0.5 to 1.0 μm.

Note that in the above-mentioned embodiment, the conductive composition of the present invention was used for the conductive material of the conductive layer 303 being the inside electrode. However, the conductive composition of the present invention can be also used for the conductive material of the outside electrode 304.

Figure 4:
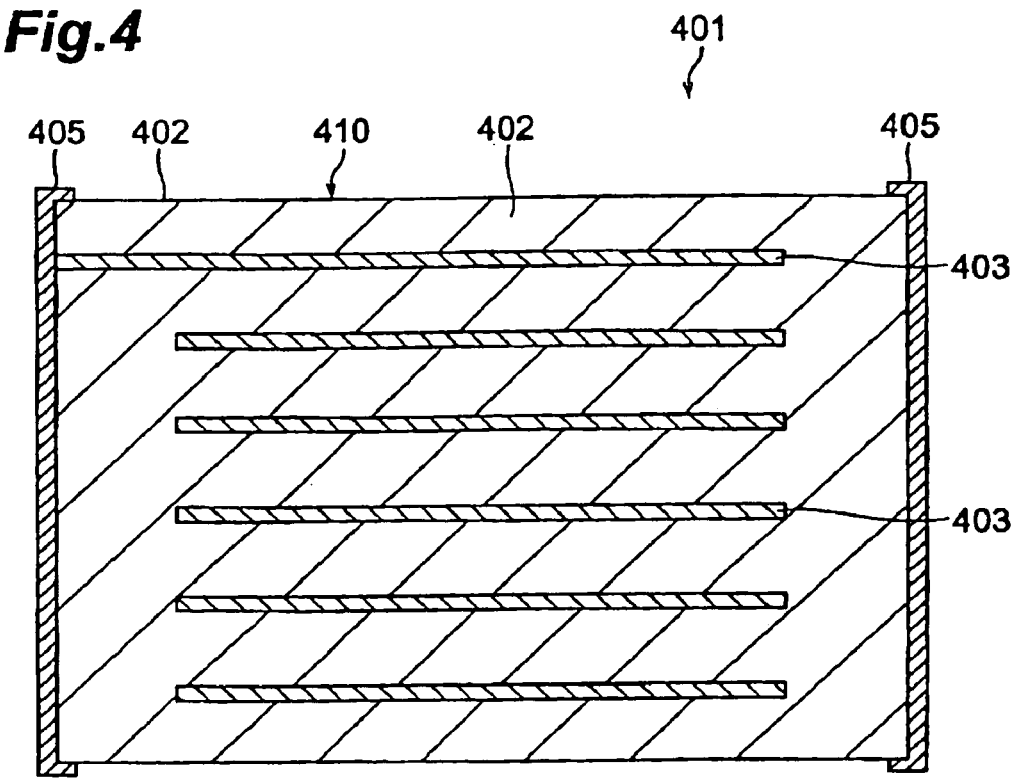
FIG. 4 is a schematic sectional view showing a preferable embodiment of a multilayer insulator according to the ceramic electronic component of the present invention.

FIG. 4 is a schematic sectional view showing a preferable embodiment of the multilayer insulator according to the ceramic electronic component of the present invention. The multilayer insulator 401 shown in FIG. 4 is provided with a chip body 410 and a pair of outside electrode 405, 405 which are arranged on the two surfaces opposing to each other in the chip body 410. The chip body 410 is integrated by alternately laminating an insulator layer 402 and the conductive layer 403. In the chip body 410, the conductive layer 403 is formed in a pattern, and a through-hole which puts the adjacent conductive layer 403 in a continuity state is formed at a predetermined position in the insulator layer 402. Thereby, a coil is constituted. In addition, both end portions of the coil are each electrically connected to one of outside electrodes 405, 405. The external form and the dimension of the chip body 410 are not particularly limited but can be suitably selected depending on the usage. Generally, the external form is nearly a rectangular solid shape, and the dimension may be about (1.0 to 5.6) mm×(0.5 to 5.0) mm×(0.6 to 1.9) mm.

The insulator layer 402 is formed by use of an insulating material. The examples of such insulating material are magnetic powders, and ceramic group magnetic powder, metal group magnetic powder, and alloy group magnetic powder are preferably used. The insulating materials may be used alone, or used in combination of two or more kinds.

The conductive layer 403 is formed by use of the conductive composition of the present invention. In this case, the conductive composition preferably comprises the metal particle of Ag or Ag alloy and the metal oxide which comprises at least one kind of the metal oxide particle selected from Mg, Al, Ti and Zr. As for Ag alloy, the preferable one is Ag—Pd alloy comprising Ag of 95 wt % or more.

The adjacent conductive layers 403 are electrically connected to each other through the through-hole, and a continuity path formed in the through-hole is also made by use of the conductive composition of the present invention. In addition, a winding pattern (closed magnetic circuit pattern) of the coil made by the conductive layer 403 which is formed as described above is not particularly limited, however, it is usually a spiral pattern. A winding number and a pitch of the coil may be suitably selected depending on the usage.

The outside electrode 405 is formed by use of the conductive material. Such conductive materials are, for example, Ag, Ni, Cu or alloys thereof. As the outside electrode 405, any one of printed film, plated film, evaporated film, ion-plated film, sputtered film, and multilayer film thereof can be applied.

Hereafter, an example of producing the multilayer insulator 401 is explained. At first, a paste for dielectric layer, a paste for conductive layer, and a paste for outside electrode are respectively prepared. Subsequently, the paste for dielectric layer and the paste for conductive layer are alternately coated using a method such as printing method, transcription method and green sheet method. Then, the obtained multilayer body is cut into the predetermined dimension followed by baking. Thus, obtained is a multilayer forming product of the insulator layer 402 and the conductive layer 403. In this case, the through-hole is formed by laser, punching, or the like, and by packing the paste for conductive layer into the through-hole, the adjacent dielectric layers 403 are conducted to form the coil. The chip body 410 is made by baking the multilayer forming product which is obtained in the above-mentioned method. Furthermore, by coating the paste for outside electrode on the predetermined surface of the chip body 410 followed by baking, the outside electrodes 405, 405 are formed to electrically connect to the end portion of the coil. Thus, the multilayer insulator 401 is obtained.

According to the above-mentioned embodiment, by use of the conductive composition of the present invention, the generation of the crack and the de-lamination can be prevented even when the insulator layer 402 is thin-layered. More specifically, the multilayer insulator having high reliability can be realized even when the thickness of the insulator layer 402 is 2 to 10 µm.

Note that in the above-mentioned embodiment, the conductive composition of the present invention was used for the conductive material of the conductive layer 403. However, the conductive composition of the present invention can be also used for the conductive material of the outside electrode 405.

Figure 5:
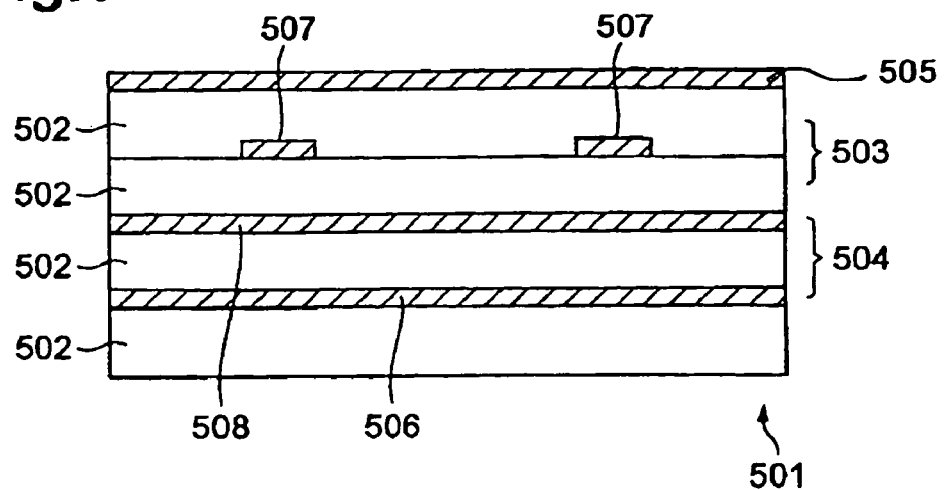
FIG. 5 is a schematic sectional view showing a preferable embodiment of a LC resonator according to the ceramic electronic component of the present invention.

FIG. 5 is a schematic sectional view showing a preferable embodiment of a LC resonator according to the ceramic electronic component of the present invention. A LC resonator 501 shown in FIG. 5 is made by sandwiching a multilayer body with two GND patterns 505, 506 from both sides in the laminating direction. The multilayer body is formed by arranging a coil 503 and a capacitor 504 on a different dielectric layer 502 respectively inside a multi-layered substrate which is constituted by a plural of dielectric layers 502.

The GND pattern 505 is an electrode for trimming when the resonance frequency of the LC resonator 501 is adjusted. The trimming is performed by selecting a position where a coil pattern 507 is not patterned as described later. Thereby, when not only the GND pattern 505 but also the dielectric layer thereunder is cut out through the trimming, a property defect and the like caused by a damage of a coil pattern 507 can be prevented.

The coil pattern 507 of the coil 503 and a capacitor electrode pattern 508 of the capacitor 504 are each formed by use of the conductive composition of the present invention. The coil pattern 507 is provided on the nearest side to the GND pattern 505 based on the laminating direction. Meanwhile, the capacitor electrode pattern 508 of the capacitor 504 is provided on the farthest side to the GND pattern 505 based on the laminating direction. In addition, the coil pattern 507 is patterned in some areas on the dielectric layer 502. On the other hand, the capacitor electrode pattern 508 is patterned almost over the whole area of the dielectric layer 502.

Through the forgoing configuration, the LC resonator 501 can be realized in which the coil 503 and the capacitor 504 are built-in between two GND patterns 505 and 506. Further, by using the conductive composition of the present invention for the component materials of the coil pattern 507 and the capacitor electrode pattern 508, a high reliability is accomplished even when each layer is thin-layered.

EXAMPLES

Hereinafter, the present invention is more specifically explained based on the examples and the comparative examples. However, the present invention is not limited to the following examples.

Example 1

The multilayer capacitor was produced in accordance with the following procedures.

At first, $Al_2O_3$ particle (average particle size: 50 nm, BET value: 30 $m^2$/g) of 0.1 wt % and vehicle of 70 wt % composed of ethyl cellulose resin and terpineol were added to Ni particle (average particle size: 0.4 µm). The contents of $Al_2O_3$ particle and vehicle were based on the amount of Ni particle. Then, they were kneaded to obtain the conductive paste.

Meanwhile, a ceramic slurry having the formulation in which $Y_2O_3$ of 0.5 mol % was added to the composition of 100 mol % comprising $BaTiO_3$ of 97.5 mol %, $CaZrO_3$ of 2.0 mol % and MnO of 0.5 mol %, was coated by a doctor blade method on a band shaped carrier film made of synthetic resins such as polyester and polypropyrene. Subsequently, after drying, a ceramic green sheet was peeled off from the carrier film to make a band shaped ceramic green sheet of 10 µm thick. Then, the ceramic green sheet was punched into the site of 200 mm length and 200 mm width.

Onto one of the main surfaces of the obtained ceramic green sheet, the aforementioned conductive paste was printed in a pattern of the inside electrode layer by use of a screen printing equipment. The ceramic green sheet with the above-mentioned paste was multilayer so that the conductive layers might form four layers, and the multilayer forming product was obtained.

Next, the obtained multilayer forming product was heated at 300° C. in the air or at 500° C. in the atmosphere of oxygen/nitrogen of 0.1 Pa to perform a treatment of removing the binder. Subsequently, the multilayer forming product was baked for 2 hours at 1260° C. in the atmosphere of oxygen/nitrogen of $10^{-7}$ Pa, furthermore, was subjected to a reoxidation treatment at 900° C. in the atmosphere of oxygen/nitrogen of $10^{-2}$ Pa to obtain the ceramic sintered material. After baking, an indium-gallium paste was coated on each end surface of the obtained ceramic sintered material, then formed was the outside electrode which was electrically connected to the inside electrode layer.

The external dimension of the multilayer ceramic capacitor obtained above was 1.6 mm width, 3.2 mm length, 1.0 mm thick, the thickness of the dielectric layer was 3 µm, and that of the conductive layer was 1.2 µm.

Examples 2 to 5, Comparative Examples 1 to 2

In the Examples 2 to 5 and Comparative Examples 1 to 2, the multilayer capacitors were each produced similarly to the Example 1 except that the conductive pastes were prepared by setting the contents of $Al_2O_3$ in the conductive pastes as shown in Table 1.

Examples 6 to 9, Comparative Examples 3 to 4

In the Examples 6 to 9 and Comparative Examples 3 to 4, the multilayer capacitors were each produced similarly to the Example 1 except that the metal oxide particles shown in Table 1 were used instead of $Al_2O_3$ having the average particle size of 50 nm and the contents of the metal oxide particles in the conductive pastes were set to 5.0 wt % based on the amount of the Ni particle.

TABLE 1

| | Metal particle | | Metal oxide particle | | | |
|---|---|---|---|---|---|---|
| | Kind | Content (wt %) | Kind | Average particle size (nm) | BET value (m²/g) | Content (wt %) |
| Comparative Example 1 | Ni | 100 | $Al_2O_3$ | 50 | 30 | 0.05 |
| Example 1 | Ni | 100 | $Al_2O_3$ | 50 | 30 | 0.1 |
| Example 2 | Ni | 100 | $Al_2O_3$ | 50 | 30 | 2.0 |
| Example 3 | Ni | 100 | $Al_2O_3$ | 50 | 30 | 5.0 |
| Example 4 | Ni | 100 | $Al_2O_3$ | 50 | 30 | 7.5 |
| Example 5 | Ni | 100 | $Al_2O_3$ | 50 | 30 | 10.0 |
| Comparative Example 2 | Ni | 100 | $Al_2O_3$ | 50 | 30 | 12.0 |
| Comparative Example 3 | Ni | 100 | $Al_2O_3$ | 100 | 26 | 5.0 |
| Example 6 | Ni | 100 | $Al_2O_3$ | 60 | 20 | 5.0 |
| Example 7 | Ni | 100 | $Al_2O_3$ | 5 | 200 | 5.0 |
| Comparative Example 4 | Ni | 100 | $Al_2O_3$ | 2 | 250 | 5.0 |
| Example 8 | Ni | 100 | MgO | 13 | 100 | 5.0 |
| Example 9 | Ni | 100 | $TiO_2$ | 30 | 50 | 5.0 |

(Reliability Evaluation of the Multilayer Capacitor)

The capacitance at 1 kHz was measured for each of multilayer capacitors obtained above. In addition, it was checked whether or not the generation of the crack and the de-lamination was observed by analyzing the inside of the capacitor. The obtained result is shown in Table 2.

TABLE 2

| | Capacitance (nF) | Occurrence of crack and de-lamination |
|---|---|---|
| Comparative Example 1 | 25.5 | yes |
| Example 1 | 26.3 | no |
| Example 2 | 26.0 | no |
| Example 3 | 27.5 | no |
| Example 4 | 26.0 | no |
| Example 5 | 25.4 | no |
| Comparative Example 2 | 23.8 | no |
| Comparative Example 3 | 24.1 | yes |
| Example 6 | 25.5 | no |
| Example 7 | 25.9 | no |
| Comparative Example 4 | 24.4 | no |
| Example 8 | 27.3 | no |
| Example 9 | 26.7 | no |

As shown in Table 2, in the multilayer capacitors in the Examples 1 to 9, the capacitance value could be secured over the predetermined value, and the generation of the crack and the de-lamination was not observed, thus a high reliability was achieved.

On the contrary, in the multilayer capacitors in the Comparative Examples 1 to 4, the capacitance value was low, and the generation of the crack and the de-lamination was observed.

Example 10

The multilayer insulator was produced in accordance with the following procedure.

At first, $Al_2O_3$ particle (average particle size: 13 nm, BET value: 100 m²/g) of 0.1 wt % and vehicle of 30 wt % composed of ethyl cellulose resin and butylcarbinol were added to Ag particle (average particle size: 0.5 μm) The contents of $Al_2O_3$ particle and vehicle were based on the amount of Ag particle. Then they were kneaded to obtain the conductive paste. Meanwhile, the insulator paste comprising a borosilicate glass particle and an $Al_2O_3$ particle was prepared.

Next, by using the above-mentioned conductive paste and the insulator paste, the conductive layer and the insulator layer were multilayer by a printing method. In this case, the through-hole was suitably formed, which conducts the adjacent conductive layers, and the multilayer body was obtained in which the coil shaped conductor having a turn number of 3 was formed inside thereof. This multilayer body was baked at 900° C. for 10 minutes, then the multilayer insulator forming a spiral shaped winding therein was obtained whose inside conductor was 100 μm width and 15 μm thick, and whose external dimension was 1.6 mm×0.8 mm×0.4 mm.

Examples 11 to 14, Comparative Examples 5 to 6

In the Examples 11 to 14 and Comparative Examples 5 to 6, the multilayer insulators were each produced similarly to the Example 10 except that the contents of $Al_2O_3$ in the conductive pastes were set as shown in Table 3.

Examples 15 to 18, Comparative Examples 7 to 8

In the Examples 15 to 18 and Comparative Examples 7 to 8, the multilayer insulators were each produced similarly to the Example 10 except that the metal oxide particles shown in Table 3 were used instead of $Al_2O_3$ having the average particle size of 13 nm and the contents of the metal oxide particles in the conductive pastes were set to 5.0 wt % based on the amount of Ag particle.

TABLE 3

| | Metal particle | | Metal oxide particle | | | |
|---|---|---|---|---|---|---|
| | Kind | Content (wt %) | Kind | Average particle size (nm) | BET value (m²/g) | Content (wt %) |
| Comparative Example 5 | Ag | 100 | $Al_2O_3$ | 13 | 100 | 0.05 |
| Example 10 | Ag | 100 | $Al_2O_3$ | 13 | 100 | 0.1 |
| Example 11 | Ag | 100 | $Al_2O_3$ | 13 | 100 | 2.0 |
| Example 12 | Ag | 100 | $Al_2O_3$ | 13 | 100 | 5.0 |
| Example 13 | Ag | 100 | $Al_2O_3$ | 13 | 100 | 7.5 |
| Example 14 | Ag | 100 | $Al_2O_3$ | 13 | 100 | 10.0 |
| Comparative Example 6 | Ag | 100 | $Al_2O_3$ | 13 | 100 | 12.0 |
| Comparative Example 7 | Ag | 100 | $Al_2O_3$ | 100 | 26 | 5.0 |
| Example 15 | Ag | 100 | $Al_2O_3$ | 60 | 20 | 5.0 |
| Example 16 | Ag | 100 | $Al_2O_3$ | 5 | 200 | 5.0 |
| Comparative Example 8 | Ag | 100 | $Al_2O_3$ | 2 | 250 | 5.0 |
| Example 17 | Ag | 100 | $ZrO_2$ | 25 | 80 | 5.0 |
| Example 18 | Ag | 100 | $TiO_2$ | 30 | 50 | 5.0 |

(Reliability Evaluation of the Multilayer Insulator)

The Q value at 500 kHz was measured for each of 10 multilayer insulators obtained above. In addition, it was checked whether or not the generation of the crack and the de-lamination was observed by analyzing the inside of the insulator. The obtained result is shown in Table 4.

TABLE 4

| | Q value | Occurrence of crack and de-lamination |
|---|---|---|
| Comparative Example 1 | 31.2 | yes |
| Example 10 | 30.9 | no |
| Example 11 | 30.4 | no |
| Example 12 | 29.0 | no |
| Example 13 | 27.8 | no |
| Example 14 | 27.2 | no |
| Comparative Example 2 | 26.0 | no |
| Comparative Example 3 | 30.7 | yes |
| Example 15 | 29.9 | no |
| Example 16 | 27.5 | no |
| Comparative Example 4 | 26.3 | no |
| Example 27 | 28.4 | no |
| Example 18 | 28.7 | no |

As shown in Table 4, in the multilayer insulators in the Examples 10 to 18, the Q value could be secured over the predetermined value, and the generation of the crack and the de-lamination was not observed, thus a high reliability was achieved.

On the contrary, in the multilayer insulators in the Comparative Examples 5 to 8, the Q value was low, and the generation of the crack and the de-lamination was observed.

What is claimed is:

1. A ceramic electronic component comprising:
a ceramic substrate;
a conductive layer which is formed in at least one of the inside and outside of the ceramic substrate and comprises a metal particle and a metal oxide particle,
wherein said metal oxide particle which has an average particle size of 5 to 60 nm and a melting point of 1500° C. or higher, and
wherein a content of the metal oxide particle is 0.1 to 10.0 wt % based on the amount of the metal particle; and
a capacitor formed by including the ceramic substrate and the conductive layer, wherein, in the conductive layer, the metal particle is at least one kind selected from nickel and nickel alloys, and the metal oxide particle is an oxide compound comprising at least one kind of metals selected from magnesium, aluminum, titanium and zirconium.

2. A ceramic electronic component comprising:
a ceramic substrate;
a conductive layer which is formed in at least one of the inside and outside of the ceramic substrate and comprises a metal particle and a metal oxide particle,
wherein said metal oxide particle which has an average particle size of 5 to 60 nm and a melting point of 1500° C. or higher, and
wherein a content of the metal oxide particle is 0.1 to 10.0 wt % based on the amount of the metal particle; and
an insulator formed by including the ceramic substrate and the conductive layer, wherein, in the conductive layer, the metal particle is at least one kind selected from silver and silver alloys, and the metal oxide particle is an oxide compound comprising at least one kind of metals selected from magnesium, aluminum, titanium and zirconium.

* * * * *